US012752436B2

(12) United States Patent
Shirasawa et al.

(10) Patent No.: US 12,752,436 B2
(45) Date of Patent: Oct. 6, 2026

(54) END EFFECTOR WITH LINKAGE MECHANISM HAVING ARM PORTIONS AND GRIP PORTIONS

(71) Applicant: TOYOTA JIDOSHA KABUSHIKI KAISHA, Toyota (JP)

(72) Inventors: Takeru Shirasawa, Susono (JP); Atsushi Ushirone, Hiratsuka (JP); Hana Ishihara, Gotemba (JP); Yuya Takiguchi, Gotemba (JP); Taiga Muramatsu, Susono (JP); Yukiyasu Domae, Tokyo (JP); Ryuichi Takase, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 933 days.

(21) Appl. No.: 18/098,220

(22) Filed: Jan. 18, 2023

(65) Prior Publication Data

US 2023/0234243 A1 Jul. 27, 2023

(30) Foreign Application Priority Data

Jan. 25, 2022 (JP) ................................ 2022-009696

(51) Int. Cl.
*B25J 15/02* (2006.01)

(52) U.S. Cl.
CPC .................................. *B25J 15/022* (2013.01)

(58) Field of Classification Search
CPC .......... B25J 15/022; B25J 15/02; B66C 1/66; B66C 1/422; B65G 7/12
USPC ......................................... 294/118, 119, 901
See application file for complete search history.

(56) References Cited

U.S. PATENT DOCUMENTS 2,148,911 A * 2/1939 Morgan .................. B66C 1/422 294/902
3,630,391 A * 12/1971 Wilson ................ B25J 15/0226 408/69
3,843,187 A * 10/1974 Schaefer, Jr. .......... B25J 13/081 294/106
4,169,622 A * 10/1979 Claassen ................ C03B 35/20 294/119
4,262,952 A * 4/1981 Bradley .................. B66C 1/422 294/118
5,364,147 A * 11/1994 Dickey ................... B66C 1/422 294/902
6,123,376 A * 9/2000 Yakushinji .............. B66C 1/422 294/110.1
6,325,343 B1 * 12/2001 Flagg ..................... A47B 19/08 248/459
6,331,622 B1 * 12/2001 Ng .......................... C07J 53/00 540/76
2019/0176346 A1 6/2019 Ma et al.
(Continued)

FOREIGN PATENT DOCUMENTS

JP S51-83360 A 7/1976
JP 2009-101424 A 5/2009
(Continued)

*Primary Examiner* — Paul T Chin
(74) *Attorney, Agent, or Firm* — Dinsmore & Shohl LLP

(57) ABSTRACT

An end effector includes: a linkage mechanism coupled to a tip of a robot arm. Further, the linkage mechanism includes openable and closable arm portions provided on a tip side of the linkage mechanism, and grip portions acquired by extension of the arm portions.

14 Claims, 4 Drawing Sheets

(56) References Cited

U.S. PATENT DOCUMENTS

| | | | | |
|---|---|---|---|---|
| 2021/0253402 | A1* | 8/2021 | Lusty | B66C 1/442 |
| 2022/0192769 | A1 | 6/2022 | Conus et al. | |

FOREIGN PATENT DOCUMENTS

| | | | |
|---|---|---|---|
| JP | 2018-161722 | A | 10/2018 |
| JP | 2020-156645 | A | 10/2020 |
| JP | 2020-183326 | A | 11/2020 |

* cited by examiner

END EFFECTOR WITH LINKAGE MECHANISM HAVING ARM PORTIONS AND GRIP PORTIONS

CROSS-REFERENCE TO RELATED APPLICATION(S)

The present application claims priority to and incorporates by reference the entire contents of Japanese Patent Application No. 2022-009696 filed in Japan on Jan. 25, 2022.

BACKGROUND

The present disclosure relates to an end effector.

A two-claw end effector that realizes stable gripping regardless of a type of an object by using a plurality of linkages, members with different rigidity, suckers, and the like is disclosed in Japanese Laid-open Patent Publication No. 2009-101424.

SUMMARY

There is a need for providing an end effector that grips objects of various sizes and shapes without an increase in the size of the end effector.

According to an embodiment, an end effector includes: a linkage mechanism coupled to a tip of a robot arm. Further, the linkage mechanism includes openable and closable arm portions provided on a tip side of the linkage mechanism, and grip portions acquired by extension of the arm portions.

DETAILED DESCRIPTION

In the related art, since a two-claw end effector performs operation of gripping a side surface of an object, an opening degree equal to or larger than an outer diameter of the object is required. Thus, it is necessary to increase a size of the end effector according to the object. Thus, there has been a demand for an end effector capable of gripping objects of various sizes and shapes without an increase in a size thereof.

An end effector according to an embodiment of the present disclosure will be described with reference to the drawings. Note that components in the following embodiment include what can be easily replaced by those skilled in the art or what is substantially the same.

Configuration of End Effector

A configuration of the end effector according to the embodiment will be described with reference to FIG. 1 to FIG. 3. The end effector is attached to an industrial robot such as a robot arm and is to grip an object. Examples of the object gripped by the end effector include anything such as a fix-shaped object, an amorphous object, a lightweight object, and a heavy object. In addition, the "amorphous object" indicates, for example, a large bag-shaped object.

Figure 1:
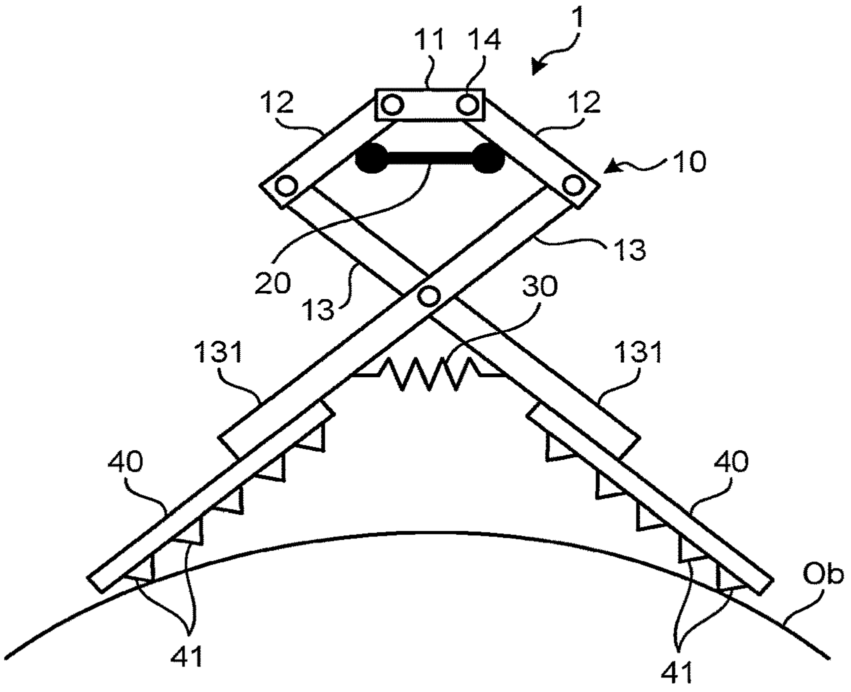
FIG. 1 is a front view illustrating a schematic configuration of an end effector according to an embodiment, and is a view illustrating a state in which arm portions and grip portions are open.

As illustrated in FIG. 1, an end effector 1 includes a linkage mechanism 10, a power source 20, an elastic member 30, and grip portions 40. The end effector 1 includes the grip portions 40 having a structure of forceps in a manner as illustrated in the drawing.

The linkage mechanism 10 has a multi-articulated link, and includes a base end link 11, a pair of first links 12, and a pair of second links 13. This linkage mechanism 10 is made of a metal material such as aluminum or stainless steel.

The base end link 11 is coupled to, for example, a tip of a robot arm. In addition, both ends of the base end link 11 are respectively coupled to the first links 12 via joints 14. The first links 12 are respectively coupled to the second links 13 via joints 14. Furthermore, the power source 20 to cause the pair of first links 12 to operate is coupled between the pair of first links 12.

The pair of second links 13 is arranged in such a manner as to intersect with each other. In addition, the intersection portion of the pair of second links 13 is coupled by a joint 14. The elastic member 30 to bias the pair of second links 13 is coupled between the pair of second links 13. Arm portions 131 are respectively provided on a tip side of the pair of second links 13. Note that the "tip side of the second links 13" indicates, in the second links 13, an opposite side of portions in which the second links 13 and the first links 12 are respectively coupled (joint 14).

The arm portions 131 are configured to be openable and closable according to operation of the pair of second links 13. In each of the arm portions 131, the grip portion 40 acquired by extension of the arm portion 131 is provided. Note that the "extension of the arm portion 131" indicates to be in an extending direction of the arm portion 131. Furthermore, although being formed in a linear shape in the example of FIG. 1, the arm portions 131 are not limited to the linear shape and may be formed in a curved shape (such as S shape or the like). For example, when the arm portions 131 are formed in the S shape, gripping force proportional to weight is maintained at "F>0" even when the arm portions 131 are closed and "θ=90°". Thus, an object Ob can be gripped more stably.

The power source 20 is to supply power to open the arm portions 131 and the grip portions 40. As the power source 20, for example, a general two-claw end effector (two-claw parallel gripper) or the like can be used. In a case where power of the power source 20 is ON, as illustrated in FIG. 1, the pair of first links 12 is separated from each other (open) and the arm portions 131 and the grip portions 40 are open. On the other hand, in a case where the power of the power source 20 is OFF, as illustrated in FIG. 2, the pair of first links 12 becomes closer to each other (is closed) and the arm portions 131 and the grip portions 40 are closed.

In a case where the two-claw end effector is used as the power source 20, the "power of the power source 20 is ON" indicates that the two-claw end effector is brought into an "open" state, and the "power of the power source 20 is OFF" indicates that the two-claw end effector is brought into a "closed" state. Note that as illustrated in FIG. 1 and FIG. 2, as the power source 20, what is other than the two-claw end effector may be used as the power source 20 as long as the pair of first links 12 can be separated from and made closer to each other.

The elastic member 30 is to generate biasing force with respect to the arm portions 131 and the grip portions 40. Specifically, this biasing force is force in a direction of closing the arm portions 131 and the grip portions 40. In addition, the biasing force of the elastic member 30 is smaller than force by which the power source 20 opens the arm portions 131 and the grip portions 40, and is set to minute force.

The end effector 1 does not necessarily include the elastic member 30. However, when the elastic member 30 is included, as illustrated in FIG. 1, initial gripping force corresponding to the biasing force of the elastic member 30 can be given when the grip portions 40 and the object Ob are first brought into contact with each other when the power source 20 is ON. As a result, as compared with a case where the elastic member 30 is not included, gripping of the object Ob by the grip portions 40 becomes easier. Note that the effect of a case where the elastic member 30 is provided becomes more remarkable as the object Ob is less likely to be gripped (such as bag-shaped amorphous object or the like).

Here, as illustrated in FIG. 1, when the power source 20 is ON, that is, in a case where the arm portions 131 and the grip portions 40 are open, the elastic member 30 is in an extended state. On the other hand, as illustrated in FIG. 2, the elastic member 30 is in a contracted state when the power source 20 is OFF, that is, in a case where the arm portions 131 and the grip portions 40 are closed.

The grip portions 40 are to grip the object Ob. The grip portions 40 are formed in a plate shape and are made of, for example, a metal material such as aluminum or stainless steel. In addition, a plurality of protrusion members 41 is provided inside the pair of grip portions 40, that is, on opposing surfaces (gripping surfaces) of the grip portions 40.

The protrusion members 41 are to support fixation of the object Ob to be gripped. In some embodiments of the end effector 1, the protrusion members 41 on the grip portions 40 may not be provided. However, it becomes possible to grip the object Ob more stably by providing the protrusion members 41.

The protrusion members 41 are made of, for example, a material having a high friction coefficient, such as rubber, a resin material such as plastic, or the like. In addition, as illustrated in FIG. 1, each of the protrusion members 41 has a shape with a pointed tip (such as conical shape or pyramid shape).

Note that each of the protrusion members 41 may have a shape with a flat tip (such as cylindrical shape or prismatic shape), a shape with a curved tip, or the like other than the shape with a pointed tip. In addition, other than the protrusion shape illustrated in FIG. 1, the protrusion members 41 may include suckers, a friction material, or the like. Furthermore, as illustrated in the drawing, the protrusion members 41 may be configured separately from the grip portions 40, or may be configured integrally with the grip portions 40.

Figure 3:
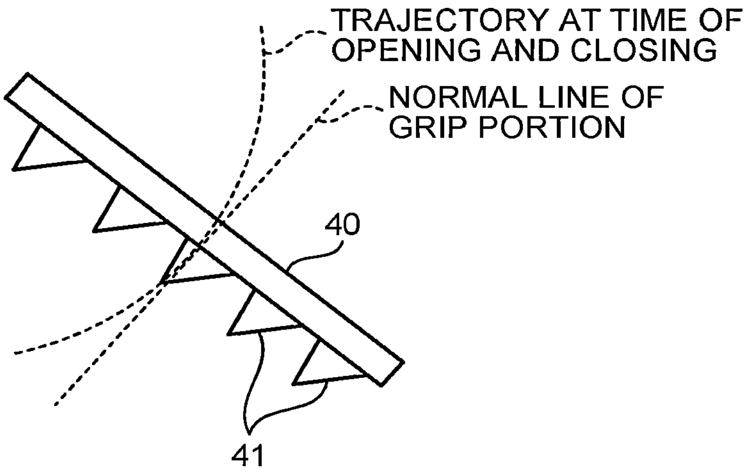
FIG. 3 is a view for describing a protrusion angle of protrusion members provided in the grip portions in the end effector according to the embodiment.

In some embodiments, a protrusion angle of the protrusion members 41 with respect to (gripping surface of) the grip portions 40 is set to a protrusion angle along a trajectory at the time of opening and closing of the grip portions 40 as illustrated in FIG. 3. That is, in some embodiments, the protrusion members 41 may have a shape inclined along the trajectory at the time of opening and closing of the grip portions 40 instead of a shape of an isosceles triangle along a normal line of the grip portions 40. Note that the "protrusion angle of the protrusion members 41" specifically indicates an angle of tips of the protrusion members 41.

As described above, by setting the protrusion angle of the protrusion members 41 to the protrusion angle along the trajectory at the time of opening and closing of the grip portions 40, it is possible to increase the gripping force with respect to the object Ob and it becomes easier to grip the object Ob.

Note that even when the protrusion members 41 have the shape with a flat tip (such as cylindrical shape or prismatic shape) or the protrusion members 41 have the shape with a curved tip, when an angle of central axes of the protrusion members 41 with respect to (gripping surface of) the grip portions 40 is set to the protrusion angle along the trajectory at the time of opening and closing of the grip portions 40, it is possible to increase the gripping force with respect to the object Ob and it becomes easier to grip the object Ob.

Operation of End Effector

Next, the operation of the end effector 1 according to the embodiment will be described with reference to FIG. 1, FIG. 2, FIG. 4, and FIG. 5. The operation of the end effector 1 can be divided into, for example, contact with the object Ob (see FIG. 1), gripping of the object Ob (see FIG. 2), and transportation of the object Ob (see FIG. 4).

(1) Contact with Object Ob

First, as illustrated in FIG. 1, the power source 20 is turned ON and the grip portions 40 are open. Then, in a state in which the grip portions 40 are open, the grip portions 40 are brought into contact with an upper portion of the object Ob. As a result, the protrusion members 41 slightly bite into the object Ob by the biasing force of the elastic member 30.

(2) Gripping of Object Ob

Figure 2:
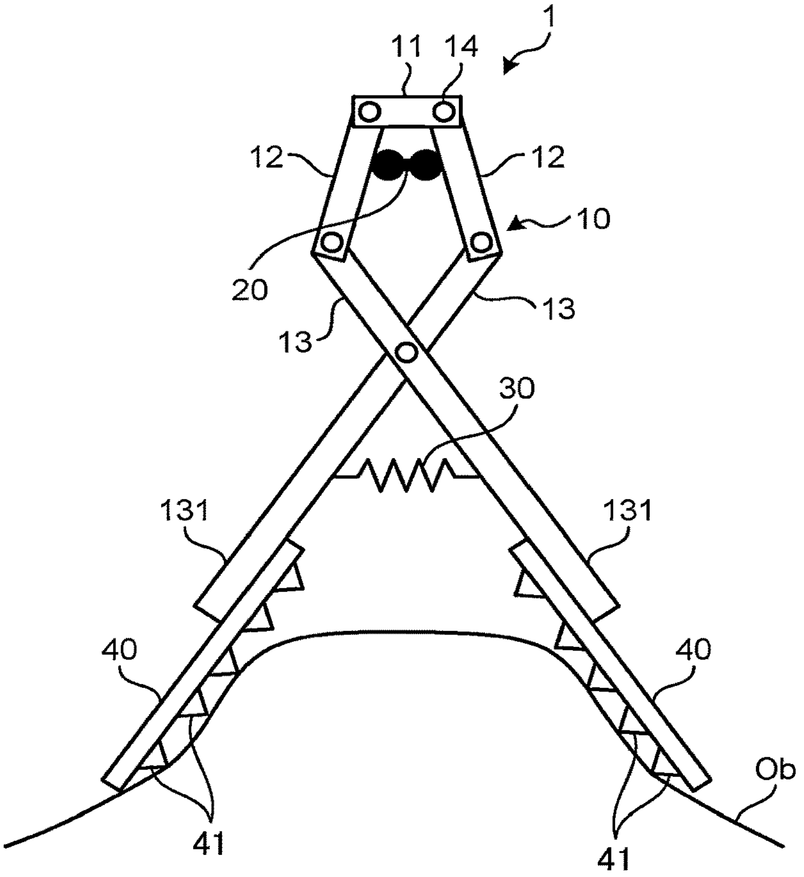
FIG. 2 is a front view illustrating the schematic configuration of the end effector according to the embodiment, and is a view illustrating a state in which the arm portions and the grip portions are closed.

Subsequently, as illustrated in FIG. 2, the power source 20 is turned OFF and the grip portions 40 are closed. That is, when power transmitted from the power source 20 to the linkage mechanism 10 becomes zero, the linkage mechanism 10 is brought into a free state and the grip portions 40 are naturally brought into a closed state. As a result, the object Ob is brought into a state of being gripped by the grip portions 40. At this time, the biting by the protrusion members 41 into the object Ob becomes stronger and the gripping force is increased.

(3) Transportation of Object Ob

Figure 4:
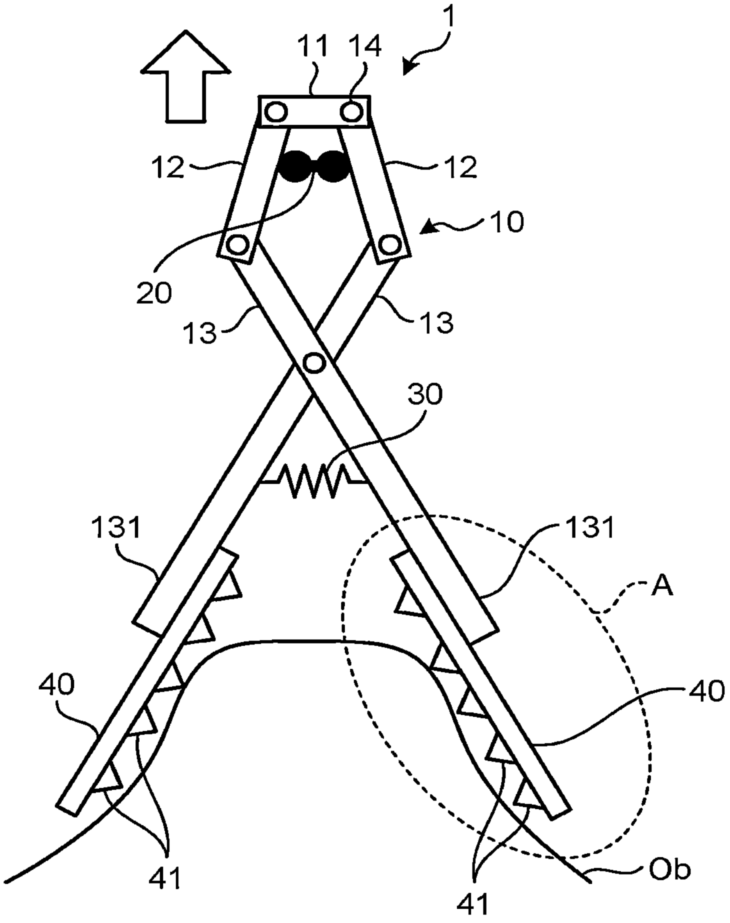
FIG. 4 is a front view illustrating the schematic configuration of the end effector according to the embodiment, and is a view illustrating a state in which a linkage is lifted upward from the state of FIG. 2.

Subsequently, as illustrated in FIG. 4, in a state in which the power source 20 is OFF, the linkage mechanism 10 and the grip portions 40 are moved upward by the robot arm coupled to the base end link 11. As a result, along with the movement of the linkage mechanism 10 and the grip portions 40, the protrusion members 41 bite into the object Ob more strongly due to weight of the object Ob, and the gripping force is further increased.

Figure 5:
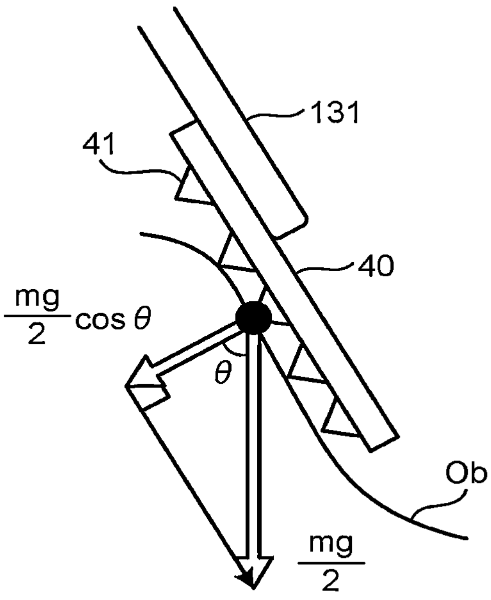
FIG. 5 is an enlarged view illustrating a portion A in FIG. 4.

FIG. 5 is an enlarged view of a portion A in FIG. 4. As illustrated in the drawing, in a state in which the object Ob is gripped by the grip portions 40, gripping force proportional to the weight of the object Ob acts. Note that in an expression illustrated in the drawing, "m" is the weight (kg) of the object Ob, and "g" is gravitational acceleration (m/sec$^2$). As described above, in the end effector 1, the gripping force by the grip portions 40 is increased as the weight of the object Ob is increased.

Here, in the existing end effector, in order to stably hold a large bag-shaped amorphous object or a heavy object, large external power and an increase in a size of the end effector are necessary. On the other hand, in the end effector 1 according to the embodiment, by combining the linkage mechanism 10 and the grip portions 40 having the structure of forceps, it becomes possible to stably grip the objects Ob of various sizes and shapes without an increase in a size of the end effector.

Furthermore, since a general two-claw end effector can be used as the power source 20 in the end effector 1, a simple and versatile mechanism can be realized.

First Modification Example

Figure 6:
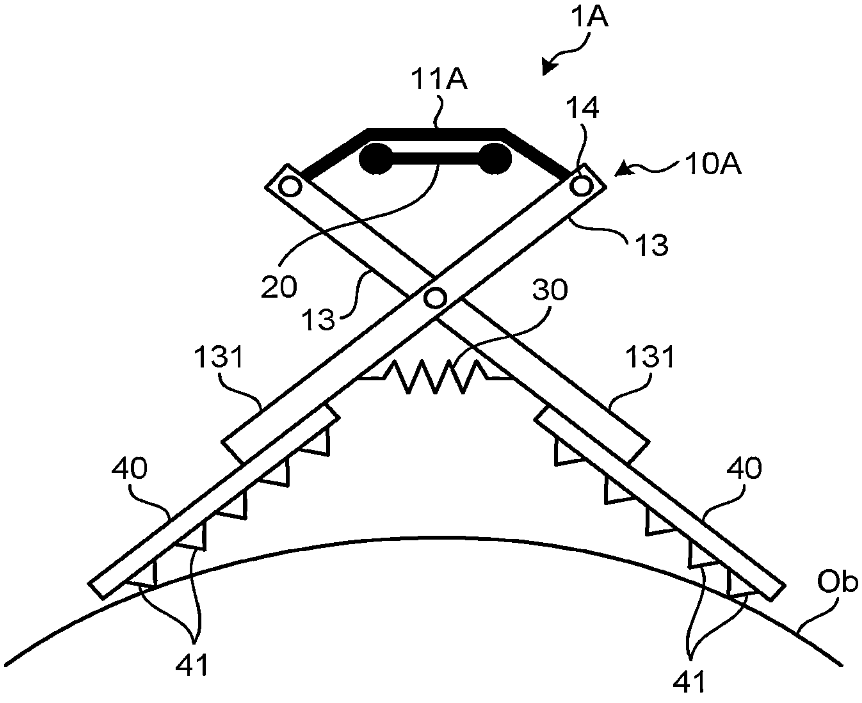
FIG. 6 is a front view illustrating a schematic configuration of a first modification example of the end effector according to the embodiment, and is a view illustrating a state in which arm portions and grip portions are open.

The first modification example of the end effector according to the embodiment will be described with reference to FIG. 6 and FIG. 7. As illustrated in FIG. 6, an end effector 1A of the first modification example includes a linkage mechanism 10A, a power source 20, an elastic member 30, and grip portions 40. Note that since a configuration of the end effector 1A is similar to that of the end effector 1 except for the linkage mechanism 10A, a description of the configuration common to the end effector 1 will be omitted.

The linkage mechanism 10A includes a string-like member 11A instead of the base end link 11 and the first links 12 of the linkage mechanism 10. The string-like member 11A includes, for example, a wire, chain, or the like. As described above, even in a case where the string-like member 11A is used instead of the base end link 11 and the first links 12, operation similar to that of the end effector 1 can be performed. Hereinafter, the operation of the end effector 1A will be described with reference to FIG. 6 and FIG. 7.

(1) Contact with Object Ob

First, as illustrated in FIG. 6, the power source 20 is turned ON and the grip portions 40 are open. Then, in a state in which the grip portions 40 are open, the grip portions 40 are brought into contact with an upper portion of the object Ob. As a result, protrusion members 41 slightly bite into the object Ob by the biasing force of the elastic member 30.

(2) Gripping of Object Ob

Subsequently, the power source 20 is turned OFF and the grip portions 40 are closed. That is, when power transmitted from the power source 20 to the linkage mechanism 10A becomes zero, the linkage mechanism 10A is brought into a free state and the grip portions 40 are naturally brought into a closed state. As a result, the object Ob is brought into a state of being gripped by the grip portions 40. At this time, the biting by the protrusion members 41 into the object Ob becomes stronger and gripping force is increased.

(3) Transportation of Object Ob

Figure 7:
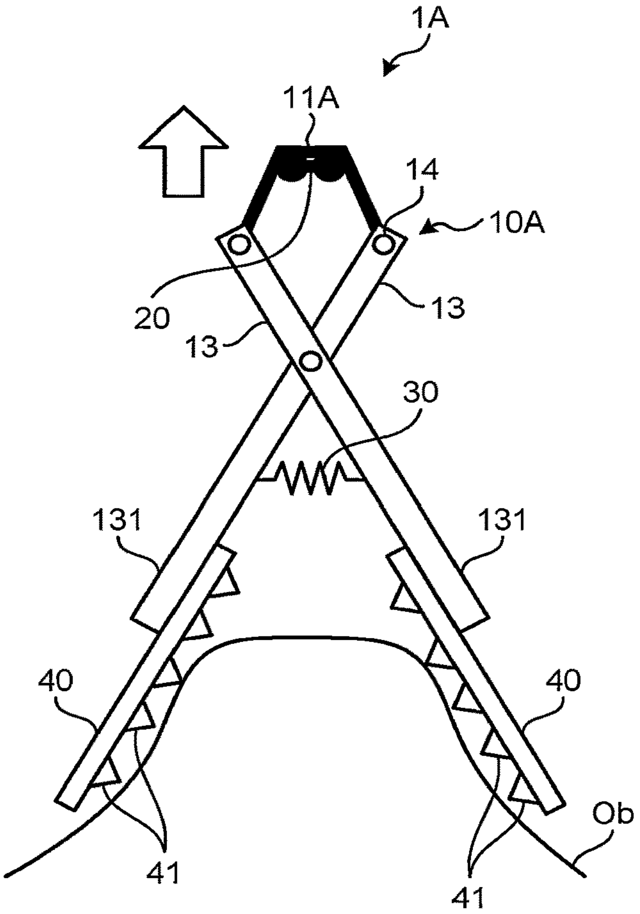
FIG. 7 is a front view illustrating the schematic configuration of the first modification example of the end effector according to the embodiment, and is a view illustrating a state in which the arm portions and the grip portions are closed.

Subsequently, as illustrated in FIG. 7, in a state in which the power source 20 is OFF, the linkage mechanism 10A and the grip portions 40 are moved upward by a robot arm coupled to the string-like member 11A. As a result, along with the movement of the linkage mechanism 10A and the grip portions 40, the protrusion members 41 bite into the object Ob more strongly due to weight of the object Ob, and the gripping force is further increased.

As described above, in the end effector 1A, by combining the linkage mechanism 10A and the grip portions 40 having a structure of forceps, it becomes possible to stably grip the objects Ob of various sizes and shapes without an increase in a size of the end effector. In addition, weight of the end effector 1A can be reduced by utilization of the string-like member 11A instead of the base end link 11 and the first links 12.

Second Modification Example

Figure 8:
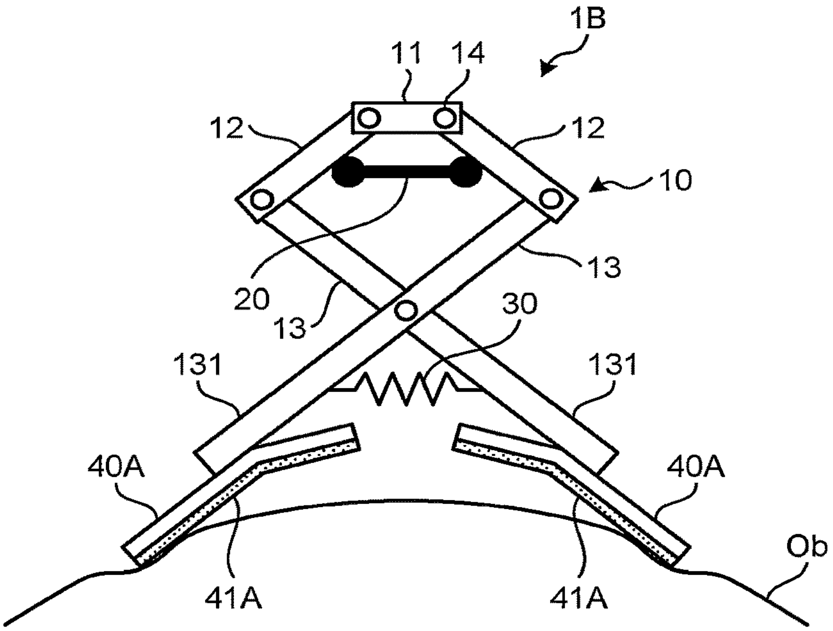
FIG. 8 is a front view illustrating a schematic configuration of a second modification example of the end effector according to the embodiment.

The second modification example of the end effector according to the embodiment will be described with reference to FIG. 8. As illustrated in the drawing, an end effector 1B of the second modification example includes a linkage mechanism 10, a power source 20, an elastic member 30, and grip portions 40A. Note that since a configuration of the end effector 1B is similar to that of the end effector 1 except for the grip portions 40A, a description of the configuration common to that of the end effector 1 will be omitted.

A shape of an inner surface (gripping surface) of each of the grip portions 40A is optimized in accordance with a shape of an object Ob. In the example illustrated in FIG. 8, the grip portions 40A are formed in a plate shape, and have a shape in which a part of the plate is bent. In addition, a friction member 41A is provided on an entire surface of an inner side of each of the pair of grip portions 40A, that is, opposing surfaces (grip surface) of the grip portions 40.

The friction members 41A are provided to support fixation of the object Ob to be gripped. The friction members 41A are made of, for example, a material having a high friction coefficient, such as rubber, or the like. As described above, since the friction members 41A made of the material having a high friction coefficient are included, the object Ob can be gripped more stably. Note that shapes of the grip portions 40A and the friction members 41A are not limited to the example illustrated in FIG. 8. For example, in a case where a shape of the object Ob is a curved surface shape, each of grip portions 40A and friction members 41A may have a curved surface shape.

As described above, in the end effector 1B, by optimizing the shapes of the grip portions 40A and the friction members 41A in accordance with the shape of the object Ob, it is possible to more stably grip the object Ob having various sizes and shapes.

According to the present disclosure, it is possible to grip objects of various sizes and shapes without the increase in the size of the end effector.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An end effector comprising:

a linkage mechanism comprising:

- a base link coupled to the tip of the robot arm;
- a pair of first links each having a proximate end and a distal end, the proximate end of each of the pair of first links is pivotally coupled to the base link;
- a pair of second links each having a link side and a tip side, the link side of each second link is pivotally coupled to the distal end of one of the pair of first links;

a pair of openable and closable arm portions each provided on a tip side of one of the pair of second links; and a pair of grip portions extending from the pair of arm portions, the grip portions acquired by extension of the arm portions.

2. The end effector according to claim 1, further comprising an elastic member, provided between the pair of second links, configured to extend when the arm portions are open and contract when the arm portions are closed.

3. The end effector according to claim 1, wherein the pair of grip portions include respective protrusion members that support fixation of an object to be gripped, and a protrusion angle of the protrusion members with respect to the pair of grip portions is set to a protrusion angle along a trajectory at a time of opening and closing of the pair of grip portions.

4. The end effector according to claim 1, wherein the protrusion members have a shape other than that of an isosceles triangle along a normal line of the grip portions.

5. The end effector of claim 1, wherein the base link comprises a pair of ends and each of the pair of first links is pivotally coupled to one of the pair of ends of the base link.

6. The end effector of claim 1, wherein each of the pair of second links further comprises an intersection portion extending between the link side and the tip side and the pair of second links are pivotally coupled to each other within the intersection portion.

7. The end effector of claim 1, wherein the arm portions are elongated and the grip portions extend in parallel with the arm portions.

8. The end effector of claim 7, wherein the elastic member is positioned between the intersection portion the pair of second links and the grip portions.

9. The end effector of claim 1, wherein each grip portion comprises protrusion members that support fixation of an object to be gripped.

10. The end effector of claim 9, wherein a protrusion angle of the protrusion members with respect to the grip portions is set to a protrusion angle along a trajectory at a time of opening and closing of the grip portions.

11. The end effector of claim 1, wherein the grip portions each comprise friction members.

12. An end effector comprising:

a linkage mechanism coupled to a tip of a robot arm, the linkage mechanism comprising:

a base link;

a pair of first links coupled to the base link; and a pair of second links coupled to the pair of first links, the pair of second links including openable and closable arm portions provided on a tip side of the pair of second links, and grip portions acquired by extension of the arm portion, wherein the grip portions including protrusion members that support fixation of an object to be gripped, and wherein a protrusion angle of the protrusion members with respect to the grip portions being set to a protrusion angle along a trajectory at a time of opening and closing of the grip portions.

13. The end effector according to claim 12, wherein the linkage mechanism includes an elastic member, provided between the arm portions, configured to extend when the arm portions are open and contract when the arm portions are closed.

14. The end effector according to claim 12, wherein the protrusion members have a conical or pyramidal shaped with a pointed tip.

* * * * *